April 5, 1932.    F. B. STREINE    1,852,942

FRICTION ROLLER

Filed Aug. 5, 1931

INVENTOR,
Frank B. Streine,
BY
Howard S. Smith,
his ATTORNEY

Patented Apr. 5, 1932

1,852,942

UNITED STATES PATENT OFFICE

FRANK B. STREINE, OF NEW BREMEN, OHIO, ASSIGNOR TO THE STREINE TOOL AND MANUFACTURING COMPANY, OF NEW BREMEN, OHIO, A CORPORATION OF OHIO

FRICTION ROLLER

Application filed August 5, 1931. Serial No. 555,247.

This invention relates to new and useful improvements in friction rollers.

It is one of the principal objects of my invention to provide a friction or tension roller for use with conveyors and other apparatus to permit the object with which it has a friction contact, to be stopped while it continues its forward movement by rolling along the surface of said object. For instance, conveyors such as endless conveyors for metal sheets in shearing machines may be provided with my tension rollers to move the sheets forward until they engage and are stopped by disappearing gages, in which event the conveyors will continue their forward movement while the friction rollers roll along the top and bottom surfaces of the outer sheets of the pack. Then, when the gages disappear, these tension rollers, held by friction against further rotation, will engage the sheets and move them forward in a quick and sure manner, which is not possible with idle rollers.

My friction rollers make it possible for the material to be stopped at exactly the same place all the time. Such accuracy is not obtainable in those machines where the conveyors themselves are stopped to gage the sheets. Furthermore the frequent starting and stopping of the endless conveyors for this purpose is not good for them or for other moving parts of the machine.

Other important and incidental objects will be brought out in the following specification and particularly set forth in the subjoined claims.

Figure 1:
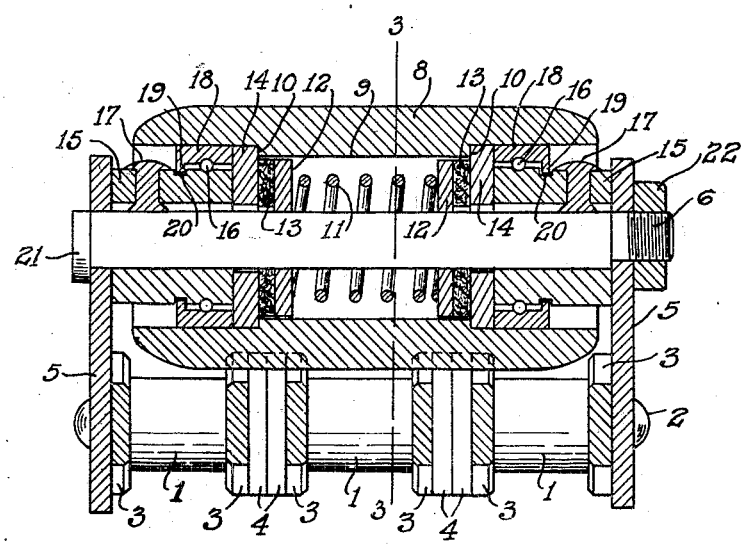
Figure 3:
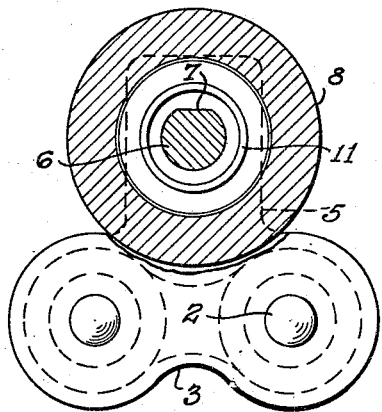
Figure 2:
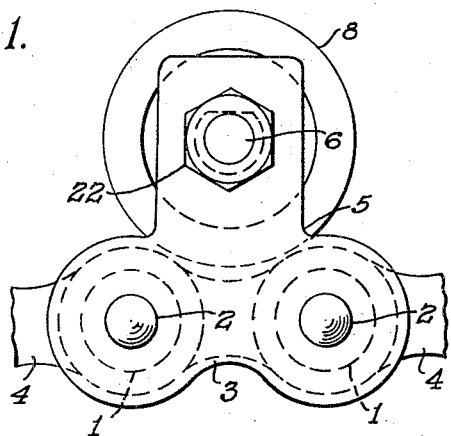

In the accompanying drawings illustrating my invention. Figure 1 is a longitudinal, sectional view taken through one of my friction or tension rollers and a part of the conveyor chain to which it is secured. Figure 2 is an end view of the same. And Figure 3 is a cross sectional view taken through the friction roller assembly on the line 3—3 of Figure 1.

Referring to the accompanying drawings for a detailed description of my invention, the numeral 1 designates a part of a conventional conveyor chain comprising chain rollers 1, pins 2, roller links 3 and pin links 4.

Secured to each pair of adjacent pins 2, 2 of the conveyor chain, against each end roller link 3, are the apertured ends of the cross portion of an inverted T shaped saddle member 5. Each saddle member 5 is formed in its outer end with a hole to receive one end of a friction roller shaft 6 which is D shaped in cross section to provide a flat surface 7 on its periphery.

Upon the shaft 6 supported by each pair of saddle members 5, 5, a friction roller 8 is mounted out of contact with the chain rollers 1 and the links 3 and 4. The friction roller 8, consisting of hollow member open at both ends, is formed with a central portion 9 of reduced diameter on its interior surface, to provide at the ends thereof two annular shoulders 10, 10.

Surrounding the middle portion of the shaft 6, within the space defined by the central part 9 of the friction roller 8, is a helical spring 11. At each end this spring is in pressure engagement with a D washer 12 preferably constructed of steel and secured against rotation on the shaft 6 because it is also of D shape in cross section.

In friction engagement with the outer face of each fixed D washer 12 is a braking washer 13 preferably constructed of fiber and freely mounted on the shaft 6. The outer faces of these friction washers 13, 13, are in braking engagement with two large steel washers 14, 14, respectively, which fit against the annular shoulders 10, 10, in the ends of the friction roller 8 for rotation with it around the shaft.

Between each steel washer 14 and its adjacent saddle member 5, there is fitted on the shaft 6 an inner race member 15 for ball bearings 16. These race members 15, 15 are prevented from turning by copper rivets 17 which they carry for engagement at their foot portions with the flat surface on the shaft.

Surrounding the axially inner portions of the race members 15, 15, for a free rotation upon the balls 16, are outer race members 18, 18 respectively. These outer race members are formed at their axially outer ends with radially inturned flanges 19 for entrance into annular grooves 20 provided in the radially outer peripheries of the inner race members 15. These flanges 19 prevent the entrance of dust and dirt into the interior of the friction roller 8.

The friction roller assembly just described is secured together by a tail flange 21 on one end of the shaft 6, which engages its respective saddle member 5, and by a co-operating nut 22 applied to the opposite end of the shaft, for engagement with the other saddle member 5. When the nut is drawn tight on the threaded end of the shaft 6, the outer race members 18 will be in sufficiently firm engagement with the steel washers 14, 14 to turn with them around the shaft.

Through their engagement with the flat surfaces of objects, such as metal sheets, these friction rollers 8, which will be held against rotation by the braking washers 13 until the sheets are stopped, will move the latter forward so long as the conveyor chains are in motion. If, on the other hand, these sheets are stopped by disappearing gages, or other means, the conveyor chains will continue their forward movement while the tension rollers 8, now overcoming the braking action of the spring pressed fiber washers 13, roll along the surface of these stationary sheets. But when these gages disappear, the tension rollers 8 will again be held against rotation by the braking action of the fiber washers, to pick up the sheets and move them forward instantly.

Having described my invention, I claim:

1. In a device of the type described, a conveyor for a sheet, a tension roller on said conveyor for engaging the surface of said sheet, and friction means for holding said roller against rotation until the sheet stops, whereupon it will roll along the surface of the stationary sheet to permit the conveyor to continue its forward movement.

2. In a device of the type described, a conveyor for a sheet, a tension roller on said conveyor for engaging the surface of said sheet, said roller adapted to roll against the surface of the sheet when the latter is stopped, and friction means on said roller to stop its rotation to pick up and move the sheet forward instantly the latter is released.

3. A tension roller of the type described, comprising a hollow cylindrical member, a shaft upon which said roller is mounted, a bearing at each end of the shaft for said roller, and braking means between the bearings within the roller to frictionally resist its rotation around the shaft.

4. A tension roller of the type described, comprising a hollow cylindrical member, a shaft upon which said roller is mounted, a bearing at each end of the shaft for said roller, a pair of spaced braking means between the bearings within the roller, and a spring surrounding the shaft between and in engagement with the braking means, to urge them outwardly to resist the rotation of the roller around the shaft.

5. A tension roller of the type described, comprising a hollow cylindrical member, a shaft upon which said roller is mounted, a bearing at each end of the shaft for said roller, said bearing including an inner stationary part and an outer rotatable part, a metal washer on said shaft free to move around the latter with each rotatable part of the bearing, a friction washer in engagement with each metal washer, and a helical spring surrounding the shaft between the friction washers for pressing them into engagement with the metal washers to resist the rotation of the roller around the shaft.

6. A tension roller of the type described, comprising a hollow cylindrical member open at both ends, a shaft of D cross section upon which said roller is mounted, a bearing at each end of the shaft for said roller, said bearing including an inner stationary part and an outer rotatable part, a metal washer on said shaft free to move around the latter with each rotatable part of the bearing, a friction washer in engagement with each metal washer, a metal D washer mounted on the shaft for engagement with each friction washer, and a helical spring surrounding the shaft between, and in engagement with, the D washer for the purpose specified.

7. A tension roller of the type described, comprising a hollow cylindrical member open at both ends, a shaft of D cross section upon which said roller is mounted, a bearing at each end of the shaft for said roller, said bearing including an inner race-way and an outer race-way, a radial element carried by each inner race-way for engagement with the flat on the shaft, ball bearings in said raceways, two annular spaced shoulders formed on the interior surface of said roller, a metal washer free to turn on said shaft between each shoulder and the race-ways, said washer fitting tightly against its respective inner race-way, a friction washer in engagement with each metal washer, a metal D washer mounted on the shaft for engagement with each friction washer, and a helical spring surrounding the shaft between, and in engagement with, the D washers, for the purpose specified.

8. In a device of the type described, the combination with a pair of adjacent chain roller assemblies, a pin projecting through each chain roller assembly, a pair of saddle members connected by said pins to said chain roller assemblies, a shaft secured to said saddle members in parallelism with said chain roller assemblies, a bearing secured to each end of said shaft in the space between the saddle members, a tension roller mounted on said bearings for rotation around said shaft, and friction means surrounding said shaft between the bearings to resist the rotation of the tension roller.

9. In a device of the type described, the combination with a pair of adjacent roller assemblies, a pin projecting through each chain roller assembly, an inverted T shaped saddle member secured by said pins to each end of said chain roller assemblies, the leg portion of each T shaped saddle member being formed with an axial hole, a shaft projecting through the axial holes in the leg portion of said saddle members, a flange formed on one end of said shaft for engagement with its respective saddle member, a nut applied to the other end of said shaft for engagement with its respective saddle member, a bearing secured to each end of said shaft, said bearings being spaced from each other and being between said saddle members, friction means surrounding said shaft for engagment with the movable part of each bearing, and a coil spring surrounding said shaft between the friction means to urge them outwardly for the purpose specified.

In testimony whereof I have hereunto set my hand this 3rd day of August, 1931.

FRANK B. STREINE.